US007120920B1

(12) United States Patent  (10) Patent No.: US 7,120,920 B1
Maeda                         (45) Date of Patent:    Oct. 10, 2006

(54) DISC DRIVE AND OPTICAL DISC DRIVE

(75) Inventor: Tetsuo Maeda, Tokyo (JP)

(73) Assignee: Sony Corporation, Tokyo (JP)

( * ) Notice: Subject to any disclaimer, the term of this patent is extended or adjusted under 35 U.S.C. 154(b) by 516 days.

(21) Appl. No.: 09/585,870

(22) Filed: Jun. 1, 2000

(30) Foreign Application Priority Data

Jun. 4, 1999  (JP)  .............................. P 11-158771

(51) Int. Cl.
    *G11B 7/08*  (2006.01)
(52) U.S. Cl. ..................................... 720/692
(58) Field of Classification Search ............... 369/75.1, 369/75.2; 360/97.1, 97.2
    See application file for complete search history.

(56) References Cited

U.S. PATENT DOCUMENTS

| | | | | |
|---|---|---|---|---|
| 4,829,502 A | * | 5/1989 | Aoyagi et al. | 369/53.45 |
| 4,831,476 A | * | 5/1989 | Branc et al. | 248/603 |
| 5,231,623 A | | 7/1993 | Kanno et al. | |
| 5,365,506 A | * | 11/1994 | Lee | 369/75.2 |
| 5,615,204 A | * | 3/1997 | Watanabe et al. | 369/247 |
| 5,657,172 A | * | 8/1997 | Shibata et al. | 310/27 |
| 5,878,013 A | * | 3/1999 | Maeda et al. | 369/75.1 |
| 5,956,314 A | * | 9/1999 | Ishimatsu et al. | 720/693 |
| 5,982,735 A | * | 11/1999 | Tsai | 369/219 |
| 6,125,097 A | * | 9/2000 | Wu | 369/263 |
| 6,160,780 A | * | 12/2000 | Furukawa et al. | 369/75.2 |
| 6,167,014 A | * | 12/2000 | Kajiyama et al. | 369/75.2 |
| 6,175,544 B1 | * | 1/2001 | Shiomi | 369/219 |
| 6,208,606 B1 | * | 3/2001 | Saito | 369/77.1 |
| 6,272,093 B1 | * | 8/2001 | Kurozuka et al. | |
| 6,275,459 B1 | * | 8/2001 | Obata et al. | |
| 6,285,649 B1 | * | 9/2001 | Bessho et al. | 369/219 |
| 6,388,971 B1 | * | 5/2002 | Fujisawa | |

FOREIGN PATENT DOCUMENTS

| | | |
|---|---|---|
| EP | 0 298 748 A2 | 1/1989 |
| EP | 0 427 490 A2 | 5/1991 |

* cited by examiner

*Primary Examiner*—David Davis
(74) *Attorney, Agent, or Firm*—Oblon, Spivak, McClelland, Maier & Neustadt, P.C.

(57) ABSTRACT

An easily manufacturable optical disc drive that provides for accurate writing and reading of information signals to and from a disc loaded therein by maintaining the horizontal balance of its base during operation, and that provides for smooth loading and unloading of a disc. The optical disc drive includes a base formed of a single metal plate of 1.4–1.8 mm thickness. Major components of the base (i.e., a disc rotation driving mechanism, an optical pickup and a pickup feeding mechanism) are disposed on the base in such a way that the total weight of these components is nearly evenly distributed on the base. The optical pickup is adapted to move across an optical disc between its inner and outer circumferences, while the optical disc is rotated by the disc rotation driving mechanism. The base is supported by a plurality (i.e., at least three) of supporting members, each with an elastic support piece. These supporting members are disposed symmetrically with respect to a center line of the base along the direction of the optical pickup's movement. The symmetrical disposition of these supporting members, together with the vibration absorbing nature of the elastic support pieces and the balanced weight distribution on the base, eliminates weight shifts/imbalance caused by the optical pickup movement, thereby maintaining the horizontal balance of the base at all time during operation of the optical disc drive. The ease of manufacture can be achieved by selecting even numbers (e.g., four) of the supporting members for the base.

34 Claims, 9 Drawing Sheets

DISC DRIVE AND OPTICAL DISC DRIVE

BACKGROUND OF THE INVENTION

1. Field of the Invention

The present invention relates to disc drives and optical disc drives, and in particular, to disc drives and optical disc drives for loading and unloading discs and for writing and reading information signal to and from such discs.

2. Description of the Related Art

Conventionally, a disc drive is used in which a disc-like recording medium such as an optical disc, magneto-optical disc or magnetic disc is used as the recording medium.

The disc drives of this type include an optical disc drive in which an optical disc is used as the recording medium. In the optical disc drive, there are installed on a common base a disc rotation driver to drive the rotation of an optical disc and an optical pickup to scan, by a light beam, a signal recording area on the optical disc being rotated by the disc rotation driver, thereby reading an information signal recorded in the optical disc.

The base is formed from a thin metal plate, fixed to a support frame by means of supporting members each provided with a vibration-proofing elastic member, and fixed to a support pedestal by means of the support frame.

The support pedestal has movably installed thereon a disc tray which holds an optical disc and carries it into and out of the optical disc drive body in which the support pedestal is housed. The disc tray is supported on the support pedestal to be movable horizontally between a first position where the optical disc is projected out of the optical disc drive body and a second position where the optical disc is placed opposite to the disc rotation driving mechanism and loaded on a disc table of the disc rotation driving mechanism. The second position is a reading position.

The support frame on which the base is installed is pivoted in a direction in which the disc table of the disc rotation driving mechanism is moved towards and away from the optical disc held in the disc tray as the disc tray is moved into and out of the optical disc drive body.

In the optical disc drive constructed as in the above, as the disc tray holding an optical disc therein is moved by a tray moving mechanism from the first position towards the second position, the support frame pivots the disc table towards the optical disc held in the disc tray. When the disc tray arrives at the second position, the disc table is projected into the disc tray, the disc tray is a little levitated and the optical disc held in the disc tray is loaded on the disc table. When the optical disc is loaded onto the disc table, a clamping member provided at the optical disc drive body to be opposite to the disc table is pressed to the optical disc, so that the optical disc will be rotatable along with the disc table.

After the optical disc has become rotatable along with the disc table, the disc rotation driving mechanism is driven to move the optical pickup between the inner and outer circumferences of the optical disc being rotated along with the disc table. A signal recording area on the optical disc is scanned by a light beam emitted from the optical pickup to read an information signal recorded in the optical disc.

In the conventional disc drive, however, since the optical pickup is moved between the inner and outer circumferences of an optical disc when reading the optical disc, the weight balance of the base is varied with the movement of the optical pickup. Among others, in case the base on which the optical pickup is installed is made from a metal plate, the base will be deflected depending upon a moved position of the optical pickup and there will take place a skew with which a light beam will not be irradiated perpendicularly to a signal recording surface on the optical disc, with a result that no information signal can be read accurately. Especially, in an optical disc drive with a large and heavy optical pickup having a plurality of light sources and a plurality of photodetectors provided therein, the base will be deflected considerably. Further, even with a little skew, no correct read of information signal can be made from an optical disc having image information, etc. recorded therein with a high density.

In an optical disc drive, in which the base is supported by supporting members each provided with an elastic member, when the weight balance of the base is changed, the weight applied to each supporting member varies, the supporting members are elastically deformed differently one from another, so that the base cannot be supported horizontally relative to a reference plane. If the base cannot be kept horizontal in an optical disc drive in which when the base is pivoted as the disc tray is pivoted, an optical disc is loaded onto the disc table, the disc tray will collide with the disc table, so that the optical disc cannot be loaded smoothly onto the disc table.

Also in a disc drive for any disc-like recording medium other than the optical disc, if the base on which the disc rotating mechanism and write and/or read head are installed is deflected as caused by the movement of the write and/or read head and thus deformed, the write and/or read head will not be able to correctly scan a recording track on the disc-like recording medium and thus to write and/or read any information signal with good writing and reading characteristics.

To prevent the base from being deflected due to a weight imbalance caused by the movement of the optical pickup and write and/or read head, it has been proposed to use a base formed from a thick metal plate which can assure a sufficient strength of the base. However, to form a base from such a thick metal plate by pressing or the like, a large force is needed. During production of a base from such a thick metal plate, the large pressure applied will cause a large internal stress in the metal plate. The internal stress will make it difficult to make the base highly flat.

Still needed in the field, therefore, is a disc drive and an optical disc drive that provides for accurate writing and reading of information signals to and from a disc loaded therein by maintaining the horizontal balance of its base despite the weight shift caused by a movement of an optical pickup and a writing and/or reading means. In addition, the disc drives and the optical disc drives should provide for smooth loading and unloading of a disc. The disc drives and the optical disc drives should have a highly flat base and should also be easily manufactured.

SUMMARY OF THE INVENTION

It is an objective of the invention to provide a disc drive and an optical disc drive that can maintain the horizontal balance of its base during operation, thereby enabling information signals to be more accurately recorded on and/or reproduced from a disc loaded therein.

It is a further objective of the invention to provide a disc drive and optical disc drive that can smoothly load and unload a disc.

It is an additional objective of the invention to provide a disc drive and optical disc drive that has a highly flat base.

It is an additional objective of the invention to provide a disc drive and optical disc drive that can be simply and easily manufactured.

Features of the invention include balanced weight distribution on a base of a disc drive and an optical disc drive, symmetrical disposition of a plurality of supporting means on the base along its center line, location-dependent provision of an elastic member with different elasticity to each of the supporting members on the base, and location-dependent provision of differential height support among the supporting means on the base.

Advantages of the invention include elimination of weight shifts/imbalance during operation of the disc drive and the optical disc drive, smooth loading/unloading of a disc, and ease of manufacture of the disc drive and the optical disc drive.

According to one aspect of the invention, an optical disc drive includes a base, disc rotation driving means disposed on the base for rotating an optical disc loaded in the base, an optical pickup disposed on the base for recording data on and/or reproducing data from the optical disc, guide means disposed on the base for movably supporting the optical pickup between inner and outer circumferences of the optical disc during rotation of the optical disc, a feeding mechanism disposed on the base for feeding the optical pickup along the guide means, and a plurality of supporting means (e.g., four) disposed on the base, each with an associated elastic member for elastically supporting the base, wherein the supporting means and the associated elastic members are disposed symmetrically on the base with respect to a center line of the base along the direction of movement of the optical pickup.

According to another aspect of the invention, an optical disc drive includes a support pedestal, a base supported by the support pedestal, disc rotation driving means disposed on the base for rotating an optical disc loaded in the base, a disc tray movably disposed on the support pedestal between a first position where the optical disc is removable and a second position where the optical disc is at the disc rotation driving means, an optical pickup disposed on the base for recording data on and/or reproducing data from the optical disc, guide means disposed on the base for movably supporting the optical pickup between inner and outer circumferences of the optical disc during rotation of the optical disc, a feeding mechanism disposed on the base for feeding the optical pickup along the guide means, and a base support member for supporting the base with a plurality of supporting means disposed symmetrically with respect to a center line of the base along the direction of the movement of the optical pickup, wherein each of the supporting means includes an elastic member.

Of the plurality of supporting means, at least one disposed near the disc rotation driving means has a different supporting elasticity from at least another one disposed away from the disc rotation driving means, so that any imbalance of the weight caused by the movement of the writing and/or reading means is absorbed by the supporting means to keep the base horizontal. Further, at least one of the supporting means disposed near the disc rotation driving means supports the base at a different height relative to a reference plane from a height at which at least another one of the supporting means disposed away from the disc rotation driving means supports the base, so that these supporting means are elastically deformed correspondingly to the magnitude of the weight applied thereto, thereby maintaining the base horizontal.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings, of which.

DETAILED DESCRIPTION OF THE INVENTION

Figure 1:
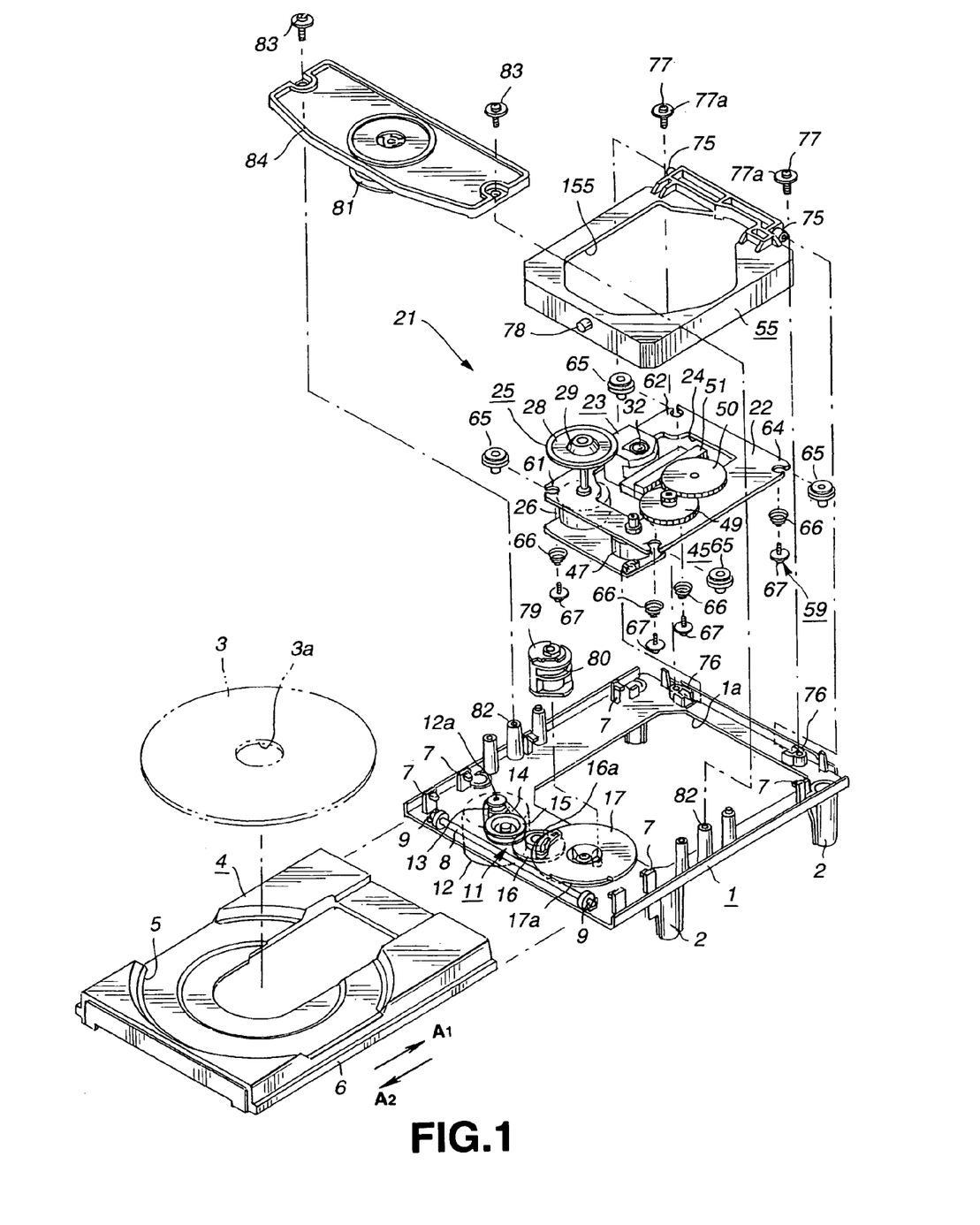
FIG. 1 is an exploded perspective view of an optical disc drive according to the present invention.
Figure 2:
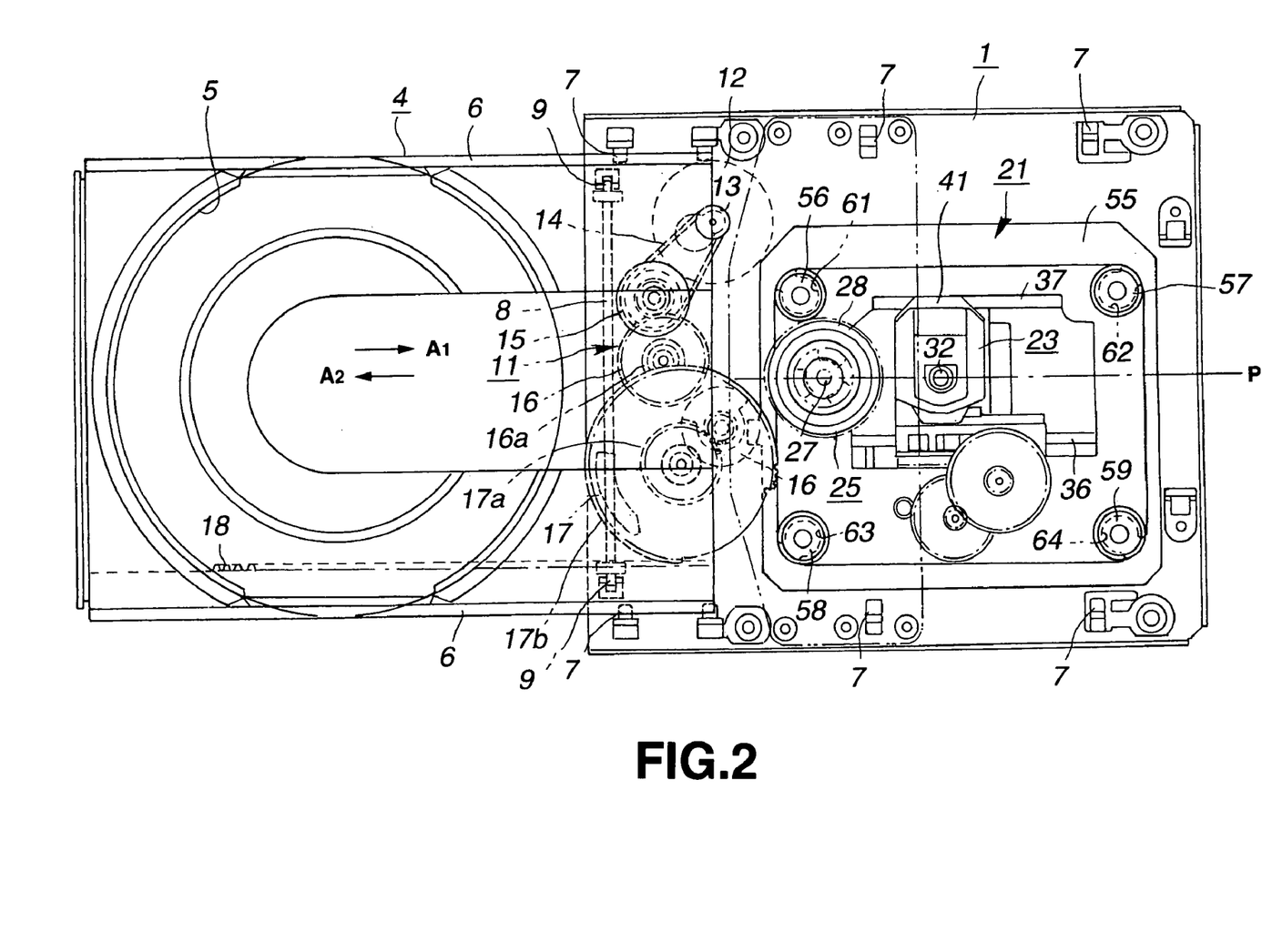
FIG. 2 is a plan view of an optical disc drive according to the present invention with a disc tray moved to a position that allows loading and unloading of an optical disc.

FIGS. 1 and 2 illustrate an optical disc drive according to the present invention in an exploded perspective view and a plain view, respectively. The optical disc drive includes a support pedestal 1 disposed inside a casing (not shown). The support pedestal 1 constitutes a main body of the optical disc drive, is formed by molding a synthetic resin, and has a support foot 2 disposed at each corner of the bottom thereof.

Figure 3:
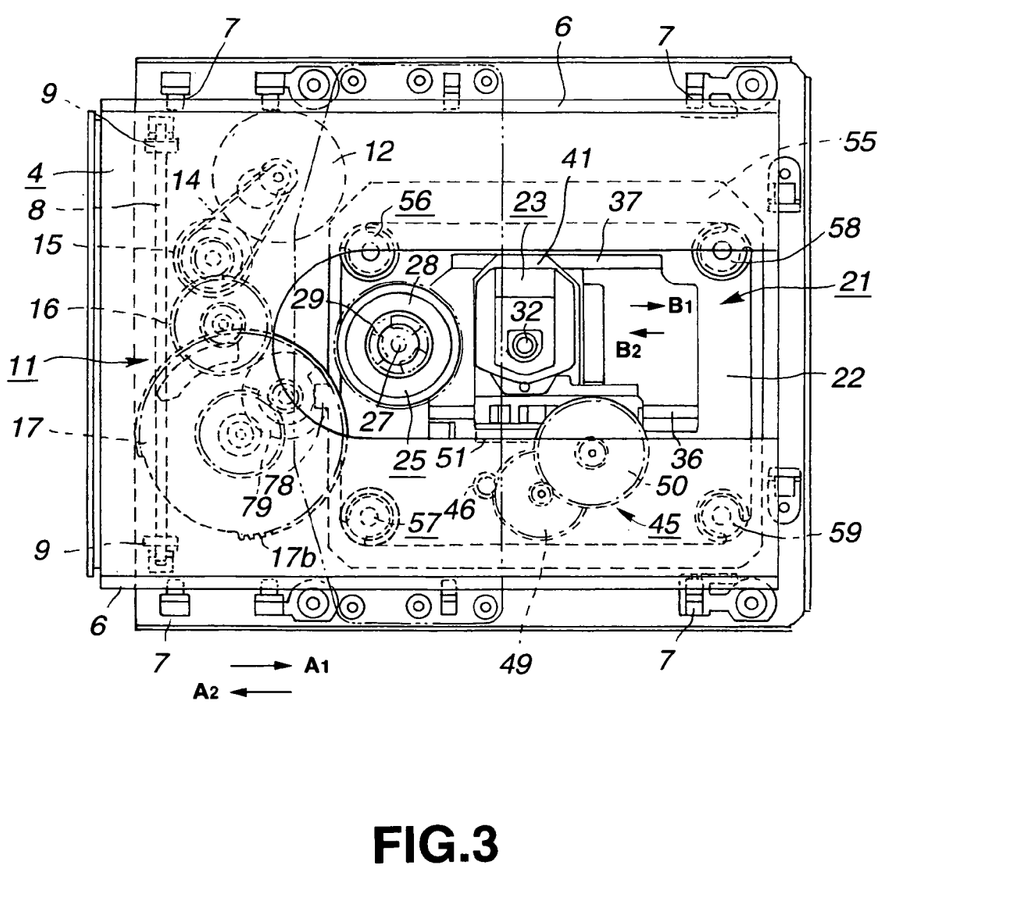
FIG. 3 is a plan view of an optical disc drive according to the present invention with a disc tray moved to another position that allows reading from, and writing to, of an optical disc.

The optical disc drive also includes a disc tray 4 disposed on the support pedestal 1 for holding and carrying an optical disc 3 in and out of the support pedestal 1. The disc tray 4 contains a disc receiving concavity 5 on its upper surface for selectively position and securely hold a optical disc of two different sizes. Rails 6 are disposed along opposite sides of the disc tray 4. The support pedestal 1 has a plurality of rail supports 7 disposed along opposite sides thereof. The rails 6 of the disc tray 4 are movably supported on the rail supports 7 of the support pedestal 1 in the directions of arrows $A_1$ and $A_2$. That is, the disc tray 4 is movably supported between a first portion inside the casing (not shown), as illustrated in FIG. 2, and a second position outside the casing (not shown), as illustrated in FIG. 3. At the first position, the disc tray 4 with the optical disc 3 in the disc receiving concavity 5 is drawn out of the casing, thereby allowing the optical disc 3 to be removed from the disc receiving concavity 5. At the second position, an information signal can be read from the optical disc 3. Thus, the first position is a disc loading/unloading position, while the second position is a disc reading/writing position. A plurality of rollers 9, which are connected to each other by a shaft 8, are disposed at the front side of the support pedestal 1. The rollers 9 support the lower side of the disc tray 4 and enable the disc tray 4 to move smoothly.

The disc tray 4 is moved between the first position (see FIG. 2) and the second position (see FIG. 3) by a tray feeding mechanism 11 disposed on the support pedestal 1. As shown in FIG. 1, the tray feeding mechanism 11 includes a drive motor 12 fixed to the lower surface of the support pedestal 1. The drive motor 12 has a drive shaft 12a projecting out to the upper surface of the support pedestal 1. The tray feeding mechanism 11 also includes a pulley gear 15 connected by a belt 14 to a pulley 13, which is fixed on the drive shaft 12a. The pulley gear 15 has a gear 15a, which is meshed with a coupling gear 16, installed rotatably to the support pedestal 1. The coupling gear 16 has a small-diameter gear 16a, which is meshed with a coupling gear 17a of a tray feeding gear 17, which is installed rotatably to the support pedestal 1. The tray feeding gear 17 has a large-diameter gear 17b at its outermost circumference that is meshed with a rack gear 18, which is disposed along one side of the lower surface of the disc tray 4.

In the tray feeding mechanism 11 thus constructed, when the drive motor 12 is put into run, the pulley gear 15 is rotated and the tray feeding gear 17 is rotated by means of the coupling gear 16. As the tray feeding gear 17 is rotated, the large-diameter gear 17b of the tray feeding gear 17, being meshed with the rack gear 18 of the disc tray 4, is rotated to move the disc tray 4 in the direction of arrow $A_1$ (i.e., from the first position to the second position) as illustrated in FIGS. 1 and 2. Alternatively, the large-diameter gear 17b is rotated to move the disc tray 4 in the direction of arrow $A_2$, as illustrated in FIGS. 2 and 3 (i.e., from the second position to the first position), correspondingly to the rotating direction of the drive motor 12.

A disc drive unit 21 is disposed on the support pedestal 1, on which the disc tray 4 is movably provided, to rotate the optical disc 3 on the disc tray 4, as well as to read an information signal recorded therein.

Figure 4:
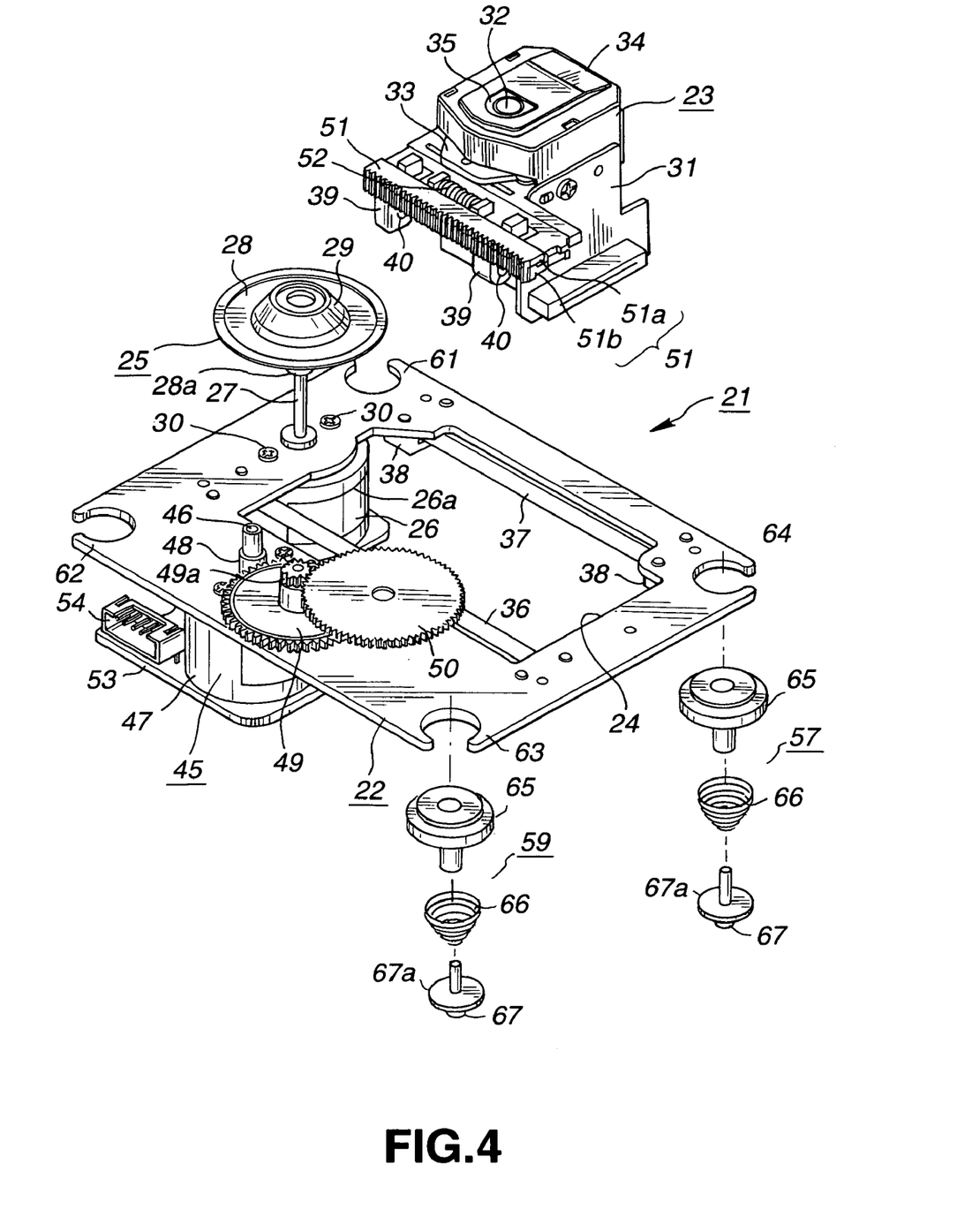
FIG. 4 is an exploded perspective view of a base of an optical disc drive in accordance with the present invention.

As will be seen from FIGS. 1 and 4, the disc drive unit 21 includes a base 22, which is formed from a flat metal plate by stamping and pressing. The base 22 is formed to have a rectangular shape and has formed in a position deviated to one end thereof from the center thereof a generally rectangular opening 24, in which an optical pickup 23 is disposed. The base 22 has installed at one end thereof a disc rotation driving mechanism 25 which drives to rotate the optical disc 3 carried on the disc tray 4. The disc rotation driving mechanism 25 includes a spindle motor 26 having a spindle 27, and a disc table 28 fixed integrally on the free end of the spindle 27. The spindle motor 26 is fixed to the lower surface of the base 22 with the spindle 27 thereof projected out to the upper surface of the base 22. The spindle motor 26 has a motor housing 26a fixed to the base 22 with fixing screws 30. The disc table 28 has provided in the center thereof a socketed projection 28a in which the freed end of the spindle 27 is fitted, so that the disc table 28 is rotatable with the spindle 27. In the center of the upper surface of the disc table 28 on which the optical disc 3 is placed, there is provided a centering boss 29 which is to be engaged in a center hole 3a in the optical disc 3 in order to make the center of the optical disc 3 coincide with the center of rotation of the disc table 28. The centering boss 29 is smaller in diameter as it goes from the base thereof towards the free end. By engaging the optical disc 3 at the center hole 3a thereof onto the free end of the centering boss 29 and lowering it towards the base end of the centering boss 29, the optical disc 3 is loaded on the disc table 28 with the center thereof made to coincide with the center of rotation of the disc table 28.

As shown, the optical pickup 23 installed to the base 22 includes an optical block 31 incorporating a light source, such as a semiconductor laser, to emit a light beam by which a signal recording area on the optical disc 3 loaded on the disc table 28 and driven to rotate, optical parts such as a beam splitter, etc. to guide the light beam emitted from the light source to an objective lens and split the light beam incident upon the objective lens, and a photo-detector to detect the light beam reflected from the optical disc 3. On the upper surface of the optical block 31 opposite to the optical disc 3, there is provided an objective lens 32 to converge the light beam emitted from the light source and focus it on the signal recording area on the optical disc 3. The objective lens 32 is supported on an objective lens moving mechanism (not shown), which moves the objective lens 32 in two axial directions perpendicular to each other, namely, in a focusing direction parallel to the optical axis of the objective lens 32 and a tracking direction perpendicular to the optical axis of the objective lens 32, namely, a direction extending radially of the optical disc 3. The objective lens moving mechanism works as follows. Namely, a light beam emitted from the light source is irradiated to the optical disc 3, a return light component of the irradiated light beam from the optical disc 3 is detected to provide a focus error signal and/or tracking error signal, the objective lens 32 is moved in the focusing direction and/or tracking direction based on the focus error signal and/or tracking error signal. Thus, the light beam irradiated through the objective lens 32 to the optical disc 3 is focused on the signal recording area on the optical disc 3, thereby scanning a predetermined recording track in the signal recording area.

The objective lens moving mechanism is constructed on a yoke 33 forming a magnetic circuit for the objective lens moving mechanism, and covered with a lid 34 installed on the optical block 31. The lid 34 has formed in the upper surface thereof a window 35 through which the objective lens 32 faces the optical disc 3.

The optical pickup 23 thus constructed is supported on the base 22 to be movable radially of the optical disc 3 being positioned inside the opening 24 and rotated on the disc rotation driving mechanism 25 as shown in FIG. 1. Further, the base 22 has installed thereon a main guide shaft 36 and sub guide shaft 37, on which the optical pickup 23 is movably supported. As shown in FIG. 4, the main and sub guide shafts 36 and 37 are fixed to the lower surface of the base 22, supported at the ends thereof on shaft supports 38, and extend along the opposite edges, respectively, of the opening 24 and in parallel to each other. The main guide shaft 36 forms a reference guide shaft for movement of the optical pickup 23, and it is installed highly parallel to a center line P1, shown in FIG. 2, passing through the center of the spindle 27 being the center of rotation of the disc rotation driving mechanism 25 installed to the base 22.

As shown in FIGS. 1 and 2, the optical block 31 has a pair of projecting guide shaft support pieces 39 provided at one side thereof optical pickup 23. The guide shaft support pieces 39 has guide shaft insertion holes 40, respectively, formed through them. Also the optical block 31 has guide supports 41 provided at the side thereof opposite to the side where the projecting guide shaft support pieces 39 are provided. Each of the guide supports 41 has a generally C-shaped section (not shown). The optical pickup 23 is supported on the base 22 with the main guide shaft 36 inserted through the guide shaft insertion holes 40 in a pair of guide shaft support pieces 39, respectively, and with the guide supports 41 engaged on the sub guide shaft 37. The optical pickup 23 is supported with the objective lens moving mechanism including the objective lens 32 being positioned on the upper surface of the base 22 and the optical block 31 being positioned on the lower surface of the base 22. Namely, the optical pickup 23 extends to both above and below the base 22.

Figure 5:
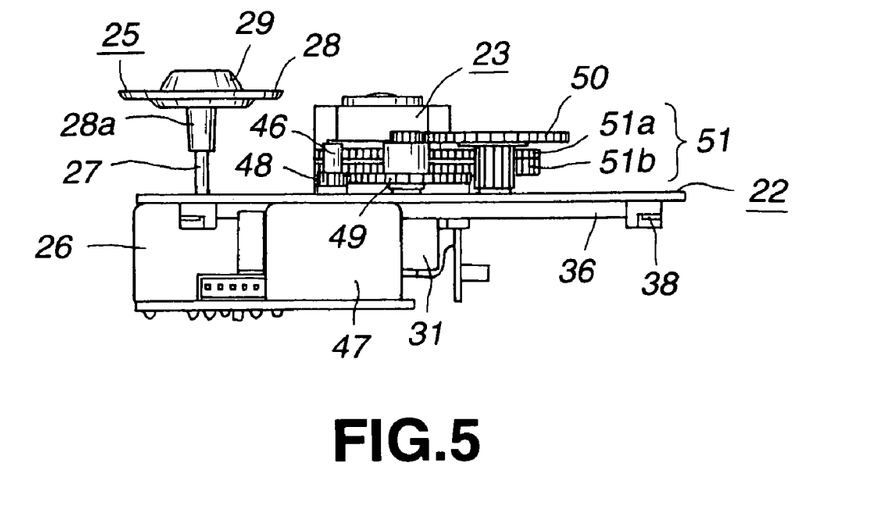
FIG. 5 is a side elevation view of a base of an optical disc drive in accordance with the present invention.

As shown in FIGS. 1 and 4, the optical pickup 23 supported on the main and sub guide shafts 36 and 37 fixed to the base 22 is moved by the pickup feeding mechanism 45 disposed on the side of the base 22 on which the main guide shaft 36 is fixed, in the directions of arrows $B_1$ and $B_2$ shown in FIG. 3 between the inner and outer circumferences of the optical disc 3 set and rotated in the disc rotation driving mechanism 25, namely, along the main guide shaft 36. As shown in FIGS. 4 and 5, the pickup feeding mechanism 45 includes a drive motor 47 having a drive shaft 46 and fixed to the lower surface of the base 22 with the drive shaft 46 projected to the upper surface of the base 22, a drive gear 48 fixed to the drive shaft 46, a coupling gear 49 having a small-diameter gear 49a and being meshed with the drive gear 48, and a feeding gear 50 meshed with the small-diameter gear 49a of the coupling gear 49. As shown in FIG. 1, in the optical pickup 23, a rack gear 51 fixed to the side of the optical block 31 at which the latter is installed on the main guide shaft 36 is meshed with a feeding gear 50 of the pickup feeding mechanism 45. Thus, the optical pickup 23 is fed in the direction of arrow $B_1$ or $B_2$ in FIG. 3 between the inner and outer circumferences of the optical disc 3 correspondingly to the rotating direction of the drive motor 47.

The rack gear 51 includes two rack plates 51a and 51b superposed on each other. There is provided a helical compression spring 52 between the rack plates 51a and 51b. Thus the rack plates 51a and 51b will be forced away from each other by the spring 51. So, a backlash caused between the feeding gear 50 of the pickup feeding mechanism 25 and the rack gear 51 of the optical pickup 23 when the optical pick-up 23 is fed, is absorbed to attain an accurate feeding of the optical pickup 23.

Further, on the lower surfaces of the spindle motor 26 and drive motor 47 fixed to the lower surface of the base 22, there is fixed a printed circuit board 53, in which there is formed a drive control circuit to control the driving of the motors 26 and 47. The printed circuit board 53 has fixed at one side thereof connection terminals 54 for supplying a power and control signal to each of the spindle motor 26 and drive motor 47.

As mentioned above, the base 22, on which the disc rotation driving mechanism 25, optical pickup 23 and optical pickup feeding mechanism 45 are installed, is fixed to a base support 55 supported pivotably on the support pedestal 1, and forms the disc drive unit 21. The base support 55 is formed by molding a synthetic resin to be a frame having a rectangular shape as shown in FIG. 1.

The base 22 has installed to the lower surface of the base support 55 thereof the disc rotation driving mechanism 25, optical pickup 23 and optical pickup feeding mechanism 45 with the optical pickup 23 being exposed to above the base support 55 through an opening 155 formed in the center of the base support 55. The base 22 is supported by the base support 55 by means of first to fourth supporting members 56 to 59 disposed symmetrically with respect to the center line $P_0$ of the base 22 extending in a direction in which the base 22 is guided by the main and sub guide shafts 36 and 37.

Figure 6:
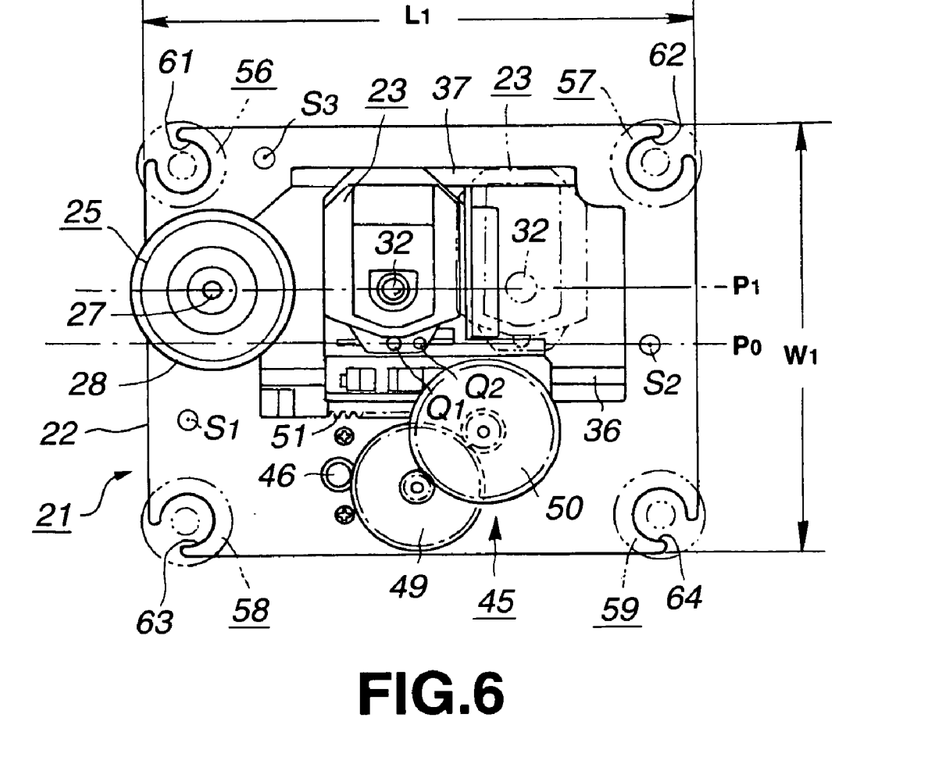
FIG. 6 is a plan view of a base of one embodiment of an optical disc drive according to the present invention.

More particularly, in one embodiment of an optical disc drive according to the present invention, a rectangular base 22 has first to fourth supporting member receiving holes 61 to 64 at each of its corners, respectively. The first to fourth supporting member receiving holes 61 to 64 are disposed on the base 22 symmetrically along a center line $P_0$ of the base 22 as shown in FIG. 6. Each of the supporting member receiving holes 61 to 64 is formed generally circular, and each of the support members 56 to 59 is partially fitted in each of the holes 61 to 64. Among these supporting member receiving holes, the first and second supporting member receiving holes 61 and 62 are disposed on one side of the base 22, while the third and fourth supporting member receiving holes 63 and 64 are disposed on the other side of the base 22, thereby forming a symmetrical arrangement along the center line $P_0$ of the base 22. Disposition of support members, supporting member receiving holes and supporting members (described below) in a symmetrical arrangement on the base 22 enables a simple and easy manufacturing process of an optical disc drive.

Figure 7:
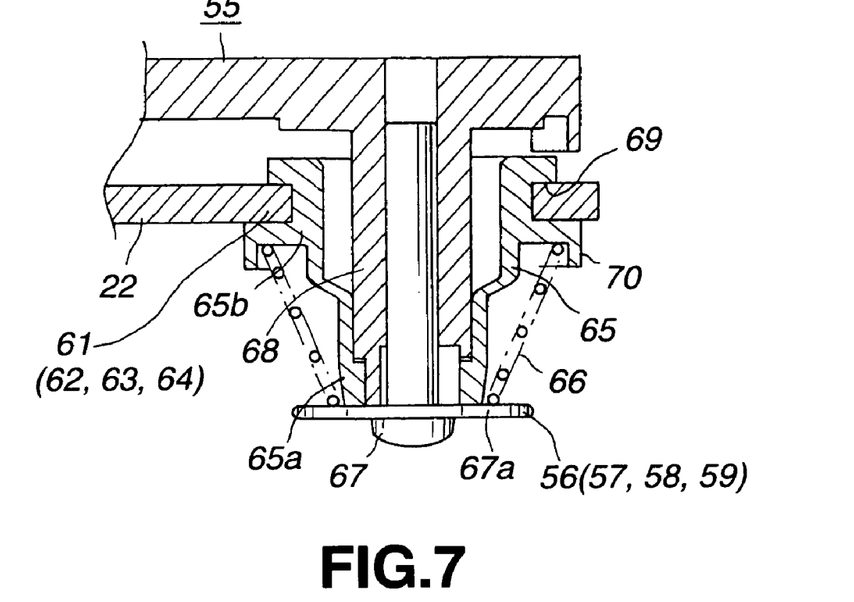
FIG. 7 is a cross-sectional view illustrating a supporting member of the base of FIG. 6.

Each of the first to fourth supporting members 56 to 59 includes a cylindrical elastic support piece 65 formed from an elastic material such as rubber, a helical spring 66 to adjust the elasticity of the elastic support piece 65, and a washer-based fixing screw 67 to fix the elastic support piece 65 along with the helical spring 66 to the base support 55, as shown in FIG. 7. The elastic support piece 65 is hollow and includes a cylindrical small-diameter portion 65a and cylindrical large-diameter portion 65b. The base support 55 has formed at each corner thereof a cylindrical support portion 68 projecting from the lower side thereof. The elastic support piece 65 is fitted at the cylindrical small diameter portion 65a on the cylindrical support portion 68. As shown, the elastic support piece 65 is grooved at 69 in the cylindrical large-diameter portion 65b thereof. The elastic support piece 65 is fitted at the groove 69 thereof in each of the first to fourth supporting member receiving holes 61 to 64. The large-diameter portion 65b of the elastic support piece 65 is recessed at the lower side thereof and along the outer edge thereof to form a spring retention projection 70. The helical spring 66 is provided around the elastic support piece 65 and between a washer base 67a of the screw 67 and the spring retention projection 70 as shown in FIG. 7.

Each of the first to fourth supporting members 56 to 59 is fixed to the base 22 with the elastic support piece 65 being fitted at the groove 69 in each of the supporting member receiving holes 61 to 64. After the supporting members 56 to 59 are fitted in the supporting member receiving holes 61 to 64, respectively, the helical spring 66 is fitted on the elastic support piece 65 and retained by the washer base 67a of the fixing screw 67, and the fixing screw 67 is screwed into the cylindrical support portion 68 of the base support 55. Thus, the base 22 is fixed to the lower side of the base support 55.

The base 22 is fixed to the base support 55 with the elastic support pieces 65 and helical springs 66. So, a disturbance such as a vibration conveyed through the base support 55 is absorbed or attenuated by the elastic support pieces 65 and helical springs 66. Thus, the disc rotation driving mechanism 25 and optical pickup 23 installed to the base 22 can be stably driven.

In an optical disc drive according to the present invention, main components of the base 22 such as the optical pickup 23, disc rotation driving mechanism 25 and pickup feeding mechanism 45, are disposed on the base 22 in such a way that their total weight is supported essentially evenly at the both sides of the base 22 relative to the center line $P_0$, as shown in FIG. 6. For example, the optical pickup 23 and the disc rotation driving mechanism 25 can be disposed on one side of the base 22 relative to the center line $P_0$, while the pickup feeding mechanism 45 can be disposed on the other side of the other side. Such an arrangement of these components prevents weight imbalance of the base 22, by essentially evenly maintaining the weight applied to one side of the base 22 along the center line $P_0$ to the other.

To reduce the size of the disc drive itself using the base 22, the base 22 is designed to have a sufficient size for installing thereon the optical pickup 23, disc rotation driving mechanism 25 and pickup feeding mechanism 45. To this end, the base 22 has installed at one end thereof heavy parts such as the spindle motor 26, further a heavier part such as the disc rotation driving mechanism 25 in which the optical disc 3 is loaded. As shown in FIG. 6, the optical pickup 23 to scan the optical disc 3 set and rotated in the disc rotation driving mechanism 25, is moved between the center of the base 22, and a position near the disc rotation driving mechanism 25 and a generally central position of the base 22 indicated with a dashed line in FIG. 6. Therefore, the center of gravity $Q_1$ of the base 22 will be displaced to the center of the spindle 27 being the center of rotation of the disc rotation driving mechanism 25, and the center of gravity $Q_2$ of the base 22 when the optical pickup 23 is moved to a position away from the disc rotation driving mechanism 25, will also be displaced to the center of the spindle 27.

Since the optical pickup 23 is supported on the base 22 to be movable parallel to the center line $P_0$ of the base 22, even when the optical pickup 23 is moved to any position, the center of gravity Q of the base 22 always lies nearly along the center line $P_0$ of the base 22.

Thus, since the center of gravity Q of the base 22 is displaced to one end of the base 22 at which the disc rotation driving mechanism 25, a large weight will be applied to the base 22 at the first and third supporting members 56 and 58 provided at the one end of the base 22. To horizontally support the base 22 with the base support 55 being a reference supporting plane, the supporting force of the first and third supporting members 56 and 58 is made larger than the supporting force of the second and fourth supporting members 57 and 59. To this end, the helical spring 66 forming each of the first and third supporting members 56 and 58 has a larger spring constant than the helical spring 66 forming each of the second and fourth supporting members 57 and 59. The base 22 is supported with a difference between the weight applied at one end of the base 22 and that applied at the other end being thus absorbed. Thus, the base 22 will be supported horizontally by the base support 55.

The first to fourth supporting members 56 to 59 supporting the base 22 are disposed symmetrically with respect to the center line $P_0$, where the center of gravity of the base 22 is approximately located. So, since the first and third supporting members 56 and 58 may have the same supporting force and the second and fourth supporting members 57 and 59 may have the same supporting force, the first to fourth supporting members 56 to 59 can be designed and manufactured more easily.

Figure 8:
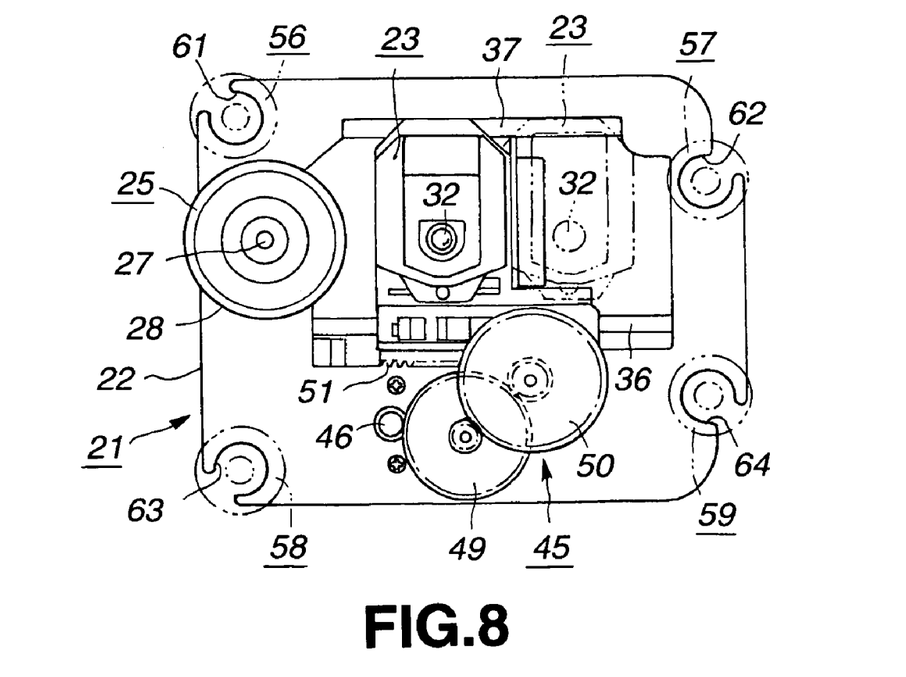
FIG. 8 is a plan view of a base of another embodiment of an optical disc drive in accordance with the present invention.

A plurality of supporting members need not be disposed at corners of the base 22. Rather, these supporting members merely need to be symmetrically disposed along the center line $P_0$ of the base 22 in order to support the base 22. For example, in another embodiment of the present invention, the second and fourth supporting members 57 and 59, supporting the other end of the base 22 opposite to the one end where the disc rotation driving mechanism 25 is installed, may be disposed at positions deviated from the corners of the base 22, as shown in FIG. 8. In this embodiment, main components of the base 22 such as the optical pickup 23, disc rotation driving mechanism 25 and pickup feeding mechanism 45, are also disposed on the base 22 in such a way that their total weight is supported essentially evenly at both sides of the base 22 relative to the center line $P_0$, as shown in FIG. 8. More specifically, the optical pickup 23 and the disc rotation driving mechanism 25 are disposed on one side of the base 22 relative to the center line $P_0$, while the pickup feeding mechanism 45 is disposed on the other side of the other side. Such an arrangement of these components prevents weight imbalance of the base 22, by nearly evenly maintaining the weight applied to one side of the base 22 along the center line $P_0$ to the other. In addition, disposition of the support members in a symmetrical arrangement on the base 22 enables a simple and easy manufacturing process of optical disc drives in accordance with the present invention.

Figure 9:
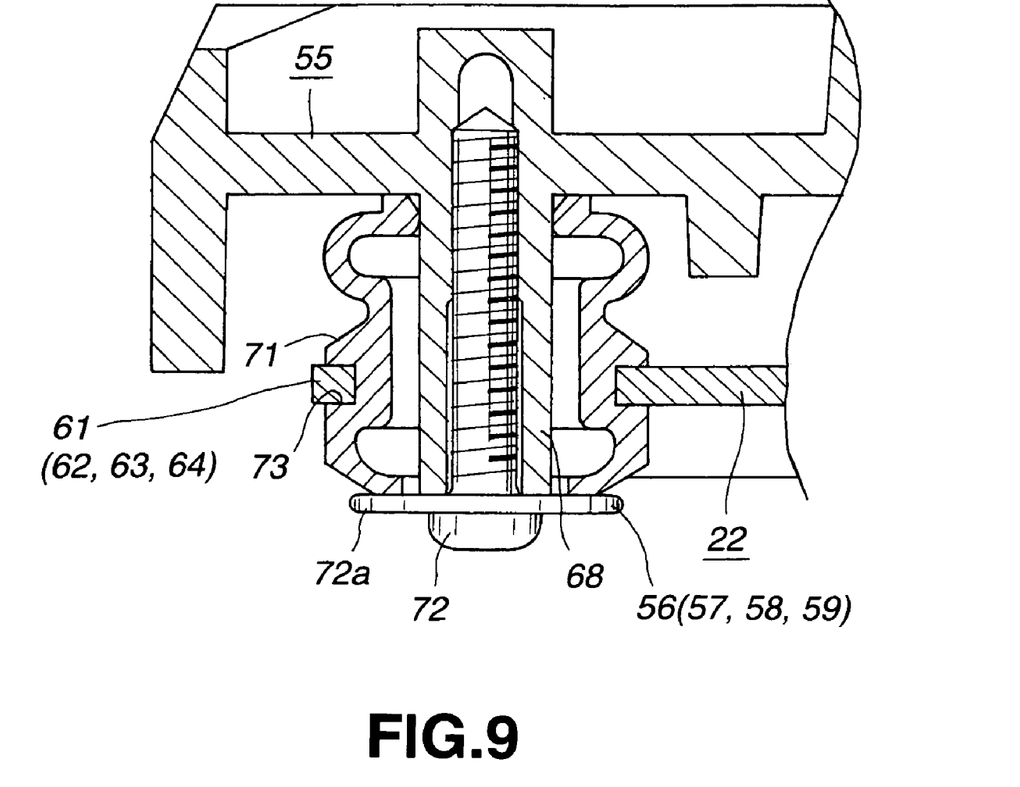
FIG. 9 is a cross-sectional view illustrating a support member of the base of FIG. 8.

Also, the first to fourth supporting members 56 to 59 supporting the base 22 may be composed each of only a cylindrical elastic support piece 71 formed from an elastic material such as rubber and a washer-based fixing screw 72 to fix the elastic support piece 71 to the base support 55, as shown in FIG. 9. The fixing screw 72 has a washer base 72a. The elastic support piece 71 of each of the supporting members 56 to 59 is fitted on the cylindrical support portion 68 projecting from the lower surface of the base support 55, and elastically compressed between the washer base 72a of the fixing screw 72 screwed into the cylindrical support portion 68 and the lower surface of the base support 55. Namely, the elastic support piece 71 is installed under a predetermined elasticity. The elastic support piece 71 is grooved at 73 in a middle outer surface thereof. The base 22 is supported on the base support 55 by means of the first to fourth supporting members 56 to 59 with the elastic support piece 71 of each of the supporting members 56 to 59 being engaged at the groove 73 in each of the supporting member receiving holes 61 to 64 of the base 22.

In case the first to fourth supporting members 56 to 59 thus constructed are used, the elastic support piece 71 forming each of the second and fourth supporting members 57 and 59 may have a larger hardness than the elastic support piece 71 forming each of the first and third supporting members 56 and 58, to absorb a difference between a weight applied to one end of the base and a one applied to the other end, whereby the base 22 can be supported horizontally by the base support 55.

Even when the first to fourth supporting members 56 to 59 constructed as shown in FIG. 9 are used to support the base 22, a disturbance such as a vibration transmitted via the base support 55 can be absorbed or attenuated by the elastic support piece 71, so it is possible to prevent any vibration from being transmitted to the disc rotation driving mechanism 25 and optical pickup 23 installed on the base 22, thus the disc rotation driving mechanism 25 and optical pickup 23 can be driven stably. In addition, instead of changing the supporting force of the support members 56 to 59, it is possible to support the base 22 horizontally by changing the establishment of the support height of the base 22. In other words, the first and third supporting members 56 and 58 support the base 22 at different height relative to a reference plane from that at which the second and fourth supporting members 57 and 59 support the base 22, so that the base 22 is elastically deformed correspondingly to the magnitude of the weight applied to the supporting members 55 to 59 and thus it can be kept horizontal.

In an optical disc drive for the optical disc 3 as a recording medium, the light beam emitted from the optical pickup 23 has to be irradiated highly perpendicularly to the signal recording surface of the optical disc 23. If such a skew that the optical axis of the light beam is oblique relative to the signal recording surface of the optical disc 3 takes place, a predetermined recording track can-not be scanned by the light beam, thus failing to correctly read an information signal recorded in the optical disc 3. Especially in an optical disc for a high recording-density optical disc 3 having video information recorded herein, any inclination of the light beam relative to the signal recording area of the optical disc 3 will result in a failure to read an information signal from the optical disc 3.

To prevent the light beam emitted from such an optical pickup 23 from being oblique relative to the signal recording area of the optical disc and irradiate the light beam highly perpendicularly to the signal recording area of the optical disc 3, the base 22 on which the optical pickup 23 and disc rotation driving mechanism 25 has to be kept highly flat.

For example, in case the base 22 is used in an optical disc drive for a recording medium such as a digital video or versatile disc (DVD) having a diameter of 12 cm, dedicated for recording video information, it is necessary that the fixed portion of the spindle motor 26 forming the disc rotation driving mechanism 25, both ends of the main guide shafts 36 and the end of the sub guide shaft 37 nearer to the disc rotation driving mechanism 25 should have a flatness of 0.03 or less in relation to first reference points S1, and S2 near the shaft supports 38 supporting the opposite ends, respectively, of the main guide shaft 36 on which the optical pickup 23 is supported, and to a third reference points S3 near the shaft supports 38 supporting the end of the sub guide shaft 37 near the disc rotation driving mechanism 25, as will be seen from FIG. 6.

To this end, the base 22 has to be formed from a material strong enough to maintain a constant flatness without any deflection caused by reception of the weight of the optical pickup 23 and disc rotation driving mechanism 25 installed on the base 22. In case the base 22 is made of a metal plate, the metal piece is stamped and bent by pressing. When a metal plate is worked by pressing to make the base 22, a large internal stress will developed in the metal plate during the manufacture if the latter is relatively thick. The internal stress will make it difficult to work the base 22 for a high flatness.

According to the present invention, the base 22 is made of a metal plate having a thickness ranging from 1.4 mm to 1.8 mm. The metal plate having such a thickness was used to form a rectangular base 22 of which the width W, is about 80 mm and length L, is about 100 mm as shown in FIG. 6. Under the conditions of the disc rotation driving mechanism 25 weighing about 50 g, optical pickup 23 weighing about 40 g and the pickup feeding mechanism 45 weighing about 30 g are installed to the base 22, the flatness, relative to the first to third reference points $S_1$ to $S_3$, of the fixed portion of the spindle motor 26, both ends of the main guide shaft 36 and the end of the sub guide shaft 37 near the disc rotation driving mechanism 25 could be kept to 0.03 or less.

Figure 10:
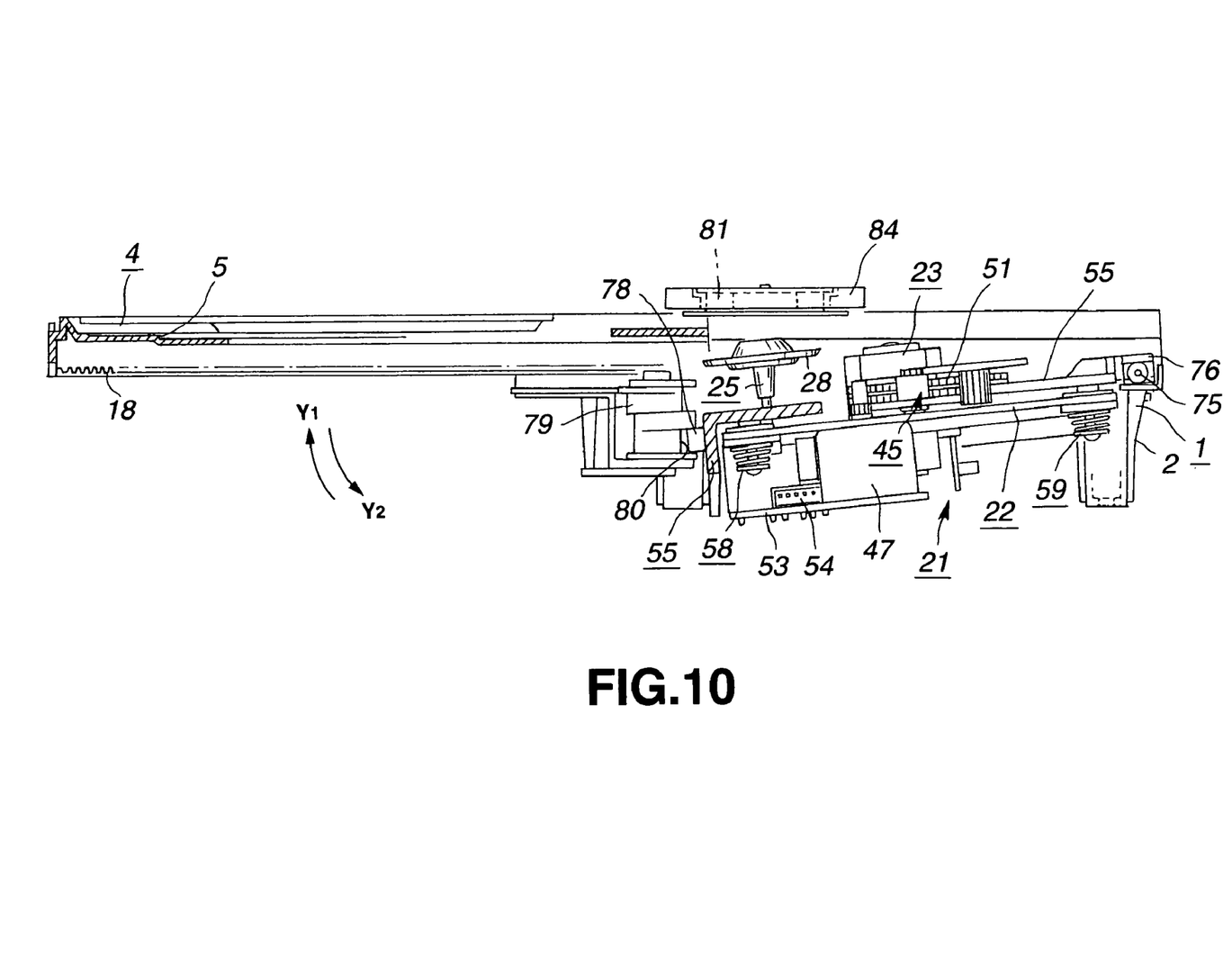
FIG. 10 is a side elevation view of an optical disc drive according to the present invention, with a disc tray moved to a first position and a base support moved downward below a support pedestal, for loading and unloading of an optical disc.

The base 22 on which the disc rotation driving mechanism 25, optical pickup 23 and pickup feeding mechanism 45 are installed as in the above is supported to the base support 55 with the first to fourth supporting members 56 to 59. As shown in FIG. 1, with a pair of pivots 75 projecting from at the opposite sides, respectively, of the other end opposite to the one end of the base 22 at which the disc rotation driving mechanism 25 is positioned, being engaged in a pair of shaft supports 76 provided at both rear sides, respectively, of the support pedestal 1, the base support 55 is installed to the support pedestal 1 pivotably about the pivots 75 in the directions of arrows $Y_1$, and $Y_2$ relative to the support pedestal 1, as illustrated in FIG. 10. The pivots 75 engaged in the shaft supports 76, respectively, are supported by flanges 77*a* formed on fixing screws 77, respectively, screwed in the shaft supports 76, respectively, and thus prevented from being disengaged from the shaft supports 76. The optical pickup 23, disc rotation driving mechanism 25 and pickup feeding mechanism 45 installed to the base 22 are thus located extending to above and below the support pedestal 1 through an opening I *a* formed in the latter, as shown in FIG. 10.

As shown in FIG. 1, the base support 55 has an engagement piece 78 projecting from the lateral face at one end thereof. As also shown in FIG. 1, the base support 55 supported on the support pedestal 1 pivotably about the pivots 75 is engaged at the engagement projection 78 thereof in a cam recess 80 formed on the outer surface of a cam gear 79 rotated by the tray feeding mechanism 11. The cam gear 79 is meshed with a tray feeding gear 17 located at the front portion of the support pedestal 1, supported pivotably on a shaft (not shown) and forming the tray feeding mechanism 11, so that it will be rotated as the disc tray 4 is fed between the first and second positions.

On the outer surface of the cam gear 79, the cam recess 80 is formed spiral from the base end towards the free end of the cam gear 79. The base support 55 is engaged at the engagement projection 78 thereof in the cam recess 80 thus formed on the cam gear 79 as mentioned above. As the earn gear 79 rotates, the engagement projection 78 is moved by the cam recess 80 axially of the cam gear 70 and thus the base support 55 is pivoted about the pivots 75 in the directions of arrows $Y_1$ and $Y_2$ in FIG. 10 relative to the support pedestal 1.

The support pedestal 1 has provided thereon a clamper 81 cooperative with the disc table 28 of the disc rotation driving mechanism 25 to have the optical disc 3 loaded on the disc table 28 rotate along with the disc table 28. The clamper 81 is installed rotatably at the center of a clamper support plate 84 extending between opposite ends of the support pedestal 1 and fixed with screws 83 to supporting projections 82 studded on the support pedestal 1.

In the optical disc drive constructed as in the above, when the disc tray 4 is drawn out of the casing to the first position where the optical disc 3 can be loaded or unloaded, the one end of the base support 55 where the disc rotation driving mechanism 25 is pivoted to a position under the support pedestal 1, as shown in FIG. 10.

When the optical disc 3 for playing is put on the disc tray 4 drawn out of the casing and then driven by the drive motor 12 of the tray feeding mechanism 11 to move in the direction of arrow A, in FIG. 2 into the casing, the cam gear 79 meshed with the tray feeding gear 17 is rotated. As the earn gear 79 is thus rotated, the base support 55 having the engagement projection 78 engaged in the cam recess 80 in the cam gear 79 is pivoted in the direction of arrow $Y_1$ in FIG. 10 about the pivots 75 relative to the support pedestal 1. That is, as the disc tray 4 is moved, the base support 55 will be pivoted towards the disc tray 4.

Figure 11:
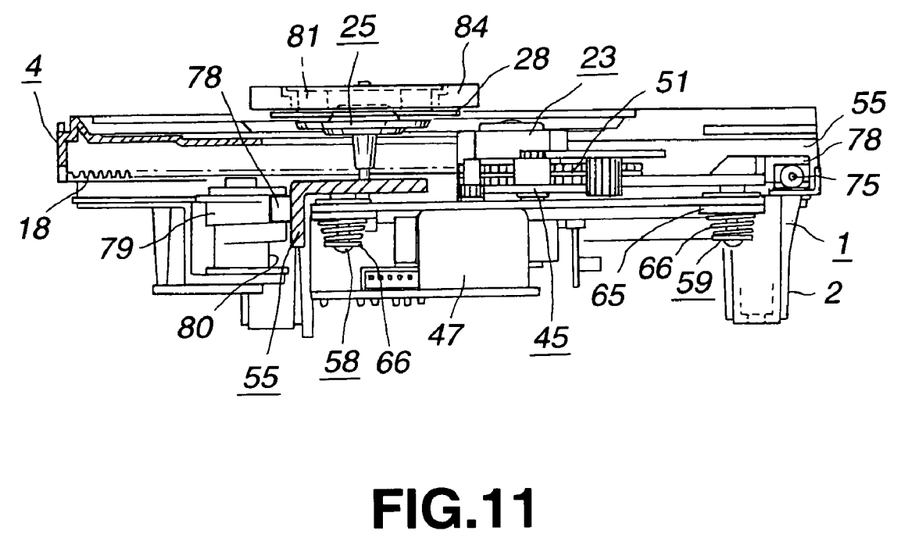
FIG. 11 is a side elevation view of an optical disc drive according to the present invention, with a disc tray moved to a second position and a base support moved upward to a level with a support pedestal, for writing to and reading from an optical disc loaded therein.

When the disc tray 4 has been moved to midway between the first position and the second position inside the casing, the base support 55 is pivoted to a position where the disc table 28 of the disc rotation driving mechanism 25 is let to go into the disc tray 4. When the base support 55 is pivoted until the disc table 28 goes into the disc tray 4, the optical disc 3 held in the disc receiving concavity 5 will be raised from the bottom of the disc receiving concavity 5 and placed on the disc table 28. Further as the disc tray 28 is moved to the second position where the optical disc 3 is read, the base support 55 will further be pivoted in the direction of arrow Y$_1$ in FIG. 10 simultaneously with the movement of the disc tray 4 and take a horizontal position relative to the support pedestal 1 as shown in FIG. 11. When the base support 55 is pivoted to the horizontal position in relation to the support pedestal 1, the clamp 81 will press the optical disc 3 placed on the disc table 28 and the optical disc 3 can be rotated along with the disc table 28. At this time, the disc tray 4 will be held at the second position where it is locked by a locking mechanism (not shown).

When the disc tray 4 has been moved to the second position and the optical disc 3 held on the disc tray 4 has been loaded rotatably along with the disc table 28, the disc rotation driving mechanism 25 is driven to drive to rotate the optical disc 3 and drive the optical pickup 23. As the optical pickup 23 is fed by the pickup feeding mechanism 45 radially of the optical disc 3, the signal recording area on the optical disc 3 is scanned by a light beam emitted from the optical pickup 23 to read an information signal recorded in the optical disc 3.

When the tray feeding mechanism 11 is driven to move the disc tray 4 in the direction of arrow A$_2$ in FIG. 3 after the optical disc 3 is read, the base support 55 is pivoted in the direction of arrow Y$_2$ in FIG. 11 towards under the support pedestal 1 as the disc tray 4 is moved. When the base support 55 has been pivoted in the direction of arrow Y$_2$ in FIG. 11, the optical disc 3 on the disc table 28 will leave the disc table 28 and be held in the disc receiving concavity 5 of the disc tray 4. The disc tray 4 will further be moved. When the disc tray 4 has been moved to the first position, the base support 55 will have left the support pedestal 1 as shown in FIG. 10.

In the optical disc drive according to the present invention, the base 22 on which the disc rotation driving mechanism 25 is installed is supported by the base support 55 to be highly flat. Therefore, the disc rotation driving mechanism 25 can be installed with an improved precision. When the base support 55 is pivoted towards and away from the disc tray 4 as the disc tray 4 is moved, the optical disc 3 can be loaded onto or unloaded from the disc table 28 with no possible collision between the disc tray 4 and disc rotation driving mechanism 25.

In the foregoing, the present invention has been described concerning the embodiment for an optical disc as the recording medium. However, the present invention may be applied to an optical disc drive for any other disc-like recording medium than the optical disc, such as a magnetic disc as advantageously as in the above.

In the optical disc drive in which the disc rotation driving mechanism and the writing and/or reading means for a disc-like recording medium driven to rotate by the disc rotation driving mechanism are installed to the base, the base can be supported highly flat. Therefore, the signal recording surface of the disc-like recording medium can be scanned while a distance between the disc-like recording medium driven to rotate by the disc rotation driving mechanism and the writing and/or reading means is being kept constant. Thus, it is possible to write or read an information signal correctly to or from the disc-like recording medium.

As having been described in the foregoing, the present invention provides a disc drive and an optical disc drive in which the base on which the disc rotation driving mechanism and writing and/or reading means are installed can be kept highly flat and can be supported by the base support and the like with the high flatness, so that an information signal can be written or read correctly and a disc-like recording medium can be smoothly loaded in place.

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A disc drive for driving a disc shaped recording medium, comprising:
    a base made of a single flat metal plate that is rectangular in shape;
    disc rotation driving means disposed on the base for rotating a disc shaped recording medium loaded in the base;
    recording and/or reading means disposed on the base for recording data on and/or reading data from the disc shaped recording medium;
    guide means disposed on the base for movably supporting the recording and/or reading means between inner and outer circumferences of the disc shaped recording medium, while the disc shaped recording medium is rotated;
    a feeding mechanism disposed on the base adapted to feed the recording and/or reading means along the guide means;
    four receiving portions adapted to receive support for the base, the receiving portions being disposed symmetrically on the base with respect to a center line of the base along the direction of the movement of the recording and/or reading means on four corners of the base; and
    four supporting means disposed in the four receiving portions, at least one of the four supporting means comprising a support piece and an adjusting piece adapted to adjust an elasticity of the support piece, a first of the four supporting means has a first supporting elasticity and is disposed near the disc rotation driving means, and a second of the four supporting means has a second supporting elasticity different from the first supporting elasticity and is disposed away from the disc rotation driving means,
    wherein the disc rotation driving means, the recording and/or reading means, and the feeding mechanism are located on the base such that a center of gravity of the base lies along the center line.

2. The disc drive according to claim 1, wherein the single metal plate is 1.4 mm to 1.8 mm in thickness.

3. The disc drive according to claim 1, wherein the disc rotation driving means and the recording and/or reading means are disposed on one side of the base relative to the center line, while the feeding mechanism is disposed on the other side of the base.

4. The disc drive according to claim 1, wherein the supporting piece comprises an elastic member adapted to elastically support the base.

5. The disc drive according to claim 4, wherein a first of the four supporting means is disposed near the disc rotation driving means and supports the base at one height relative to a reference plane, and a second of the four supporting means is disposed away from the disc rotation driving means and supports the base at a different height relative to the reference plane.

6. The disc drive according to claim 1, wherein at least two of the receiving portions are disposed on each side of the base with respect to the center line.

7. The disc drive according to claim 1, wherein the adjusting piece comprises a spring.

8. The disc drive according to claim 7, wherein the spring comprises a helical spring.

9. The disc drive according to claim 8, wherein the support piece comprises an elastic support piece formed of an elastic material.

10. An optical disc drive for recording data on and/or reproducing data from an optical disc, comprising:
   a base made of a single flat metal plate that is rectangular in shape;
   disc rotation driving means disposed on the base for rotating an optical disc loaded in the base;
   an optical pickup disposed on the base adapted to record data on and/or reproduce data from the optical disk;
   guide means disposed on the base for movably supporting the optical pickup between inner and outer circumferences of the optical disc, while the optical disc is rotated;
   a feeding mechanism disposed on the base adapted to feed the optical pickup along the guide means;
   a plurality of supporting means each with an associated elastic member adapted to elastically support the base and an adjusting piece adapted to adjust an elasticity of the elastic member, the supporting means being disposed symmetrically on the base with respect to a center line of the base along the direction of the movement of the optical pickup, wherein at least one of the supporting means has a first supporting elasticity and is disposed on the base near the disc rotation driving means, while at least another one of the supporting means has a second supporting elasticity different from the first supporting elasticity and is disposed on the base away from the disc rotation driving means;
   four receiving portions disposed on four corners of the base for receiving the supporting means,
   wherein the disc rotation driving means, the optical pickup, and the feeding mechanism are located on the base such that a center of gravity of the base lies along the center line.

11. The optical disc drive according to claim 10, wherein the single metal plate is 1.4 mm to 1.8 mm in thickness.

12. The optical disc drive according to claim 10, wherein the disc rotation driving means and the optical pickup are disposed on one side of the base relative to the center line, while feeding mechanism is disposed on the other side of the base.

13. The optical disc drive according to claim 10, wherein the supporting means disposed near the disc rotation driving means is supported at a different height relative to the supporting means disposed away from the disc rotation driving means.

14. The optical disc drive according to claim 10, wherein at least two of the supporting means are disposed on each side of the base with respect to the center line.

15. The optical disc drive according to claim 10, wherein at least two of the receiving portions are disposed on each side of the base with respect to the center line.

16. The optical disc drive according to claim 10, wherein at least one of the adjusting pieces comprises a spring.

17. The optical disc drive according to claim 16, wherein the spring comprises a helical spring.

18. An optical disc drive for recording data on and/or reproducing data from an optical disc, comprising:
   a support pedestal;
   a base made of a single flat metal plate that is rectangular in shape and has four receiving portions on four corners supported by the support pedestal;
   disc rotation driving means disposed on the base for rotating an optical disc loaded in the base;
   a disc tray movably disposed on the support pedestal between a first position where the optical disc is removable and a second position where the optical disc is at the disc rotation driving means;
   an optical pickup disposed on the base adapted to record data on and/or reproduce data from the optical disc;
   guide means disposed on the base for movably supporting the optical pickup between inner and outer circumferences of the optical disc, while the optical disc is rotated;
   a feeding mechanism disposed on the base adapted to feed the optical pickup along the guide means; and
   a base support member for supporting the base with a plurality of supporting means disposed symmetrically with respect to a center line of the base along the direction of the movement of the optical pickup and on the receiving portions of the base, each of the supporting means including an elastic member and an adjusting piece adapted to adjust an elasticity of the elastic member, wherein at least one of the supporting means has a first supporting elasticity and is disposed on the base near the disc rotation driving means, while at least another one of the supporting means has a second supporting elasticity different from the first supporting elasticity and is disposed on the base away from the disc rotation driving means,
   wherein the disc rotation driving means, the optical pickup, and the feeding mechanism are located on the base such that a center of gravity of the base lies along the center line.

19. The optical disc drive according to claim 18, wherein the single metal plate is 1.4 mm to 1.8 mm in thickness.

20. The optical disc drive apparatus according to claim 18, wherein the disc rotation driving means and the optical pickup are disposed on one side of the base relative to the center line, while the feeding mechanism is disposed on the other side of the base.

21. The optical disc drive according to claim 18, wherein the supporting means disposed near the disc rotation driving means is supported at a different, height relative to the supporting means disposed away from the disc rotation driving means.

22. The optical disc drive according to claim 18, wherein the base support member is pivotably supported around the support pedestal, thereby allowing the base support member to move towards and away from the disc tray as the disc tray moves between the first position and the second position.

23. The optical disc drive according to claim 18, wherein at least two of the supporting means are disposed on each side of the base with respect to the center line.

24. The optical disc drive according to claim 18, wherein at least one of the adjusting pieces comprises a spring.

25. The optical disc drive according to claim 24, wherein the spring comprises a helical spring.

26. An optical disc drive for accurately recording data on and/or reproducing data from an optical disc, comprising:
- a base made of a single flat metal plate that is rectangular in shape and has four receiving portions on four corners;
- disc rotation driving means disposed on the base for rotating an optical disc loaded in the base;
- an optical pickup disposed on the base adapted to record data on and/or reproduce data from the optical disc;
- guide means disposed on the base for movably supporting the optical pickup between inner and outer circumferences of the optical disc, while the optical disc is rotated;
- a feeding mechanism disposed on the base adapted to feed the optical pickup along the guide means;
- a plurality of supporting means disposed on the base with an associated elastic member adapted to elastically support the base and an adjusting piece adapted to adjust an elasticity of the elastic member, the supporting means being disposed symmetrically on the base with respect to a center line of the base along the direction of the movement of the optical pickup and on the receiving portions of the base, wherein at least one of the supporting means has a first supporting elasticity and is disposed on the base near the disc rotation driving means, while at least another one of the supporting means has a second supporting elasticity different from the first supporting elasticity and is disposed on the base away from the disc rotation driving means;
- whereby weight shifts or imbalances caused by optical pickup movement are eliminated such that the balance of the base is maintained along the direction of movement during operation of the optical disc drive.

27. The optical disc drive according to claim 26, wherein the disc rotation driving means, the optical pickup and the feeding mechanism are disposed on the base in such a way that their total weight is essentially evenly distributed on the base.

28. The optical disc drive according to claim 26, wherein at least two of the supporting means are disposed on each side of the base with respect to the center line.

29. The optical disc drive according to claim 26, wherein at least one of the adjusting pieces comprises a spring.

30. The optical disc drive according to claim 29, wherein the spring comprises a helical spring.

31. An optical disc drive for recording data on and/or reproducing data from an optical disc, comprising:
- a base made of a single flat metal plate that is rectangular in shape and has four receiving portions on four corners;
- disc rotation driving means disposed on the base for rotating an optical disc loaded in the base;
- an optical pickup disposed on the base adapted to record data on and/or reproduce data from the optical disc;
- guide means disposed on the base for movably supporting the optical pickup between inner and outer circumferences of the optical disc, while the optical disc is rotated;
- a feeding mechanism disposed on the base adapted to feed the optical pickup along the guide means; and
- at least four supporting means each with an associated elastic member adapted to elastically support the base and an adjusting piece adapted to adjust an elasticity of the elastic member, the supporting means being disposed symmetrically on the base with respect to a center line of the base along the direction of the movement of the optical pickup and on the receiving portions of the base, wherein at least one of the supporting means has a first supporting elasticity and is disposed on the base near the disc rotation driving means, while at least another one of the supporting means has a second supporting elasticity different from the first supporting elasticity and is disposed on the base away from the disc rotation driving means,
- wherein the disc rotation driving means, the optical pickup, and the feeding mechanism are located on the base such that a center of gravity of the base lies along the center line.

32. An optical disc drive according to claim 31, wherein at least two of the supporting means are disposed on each side of the base with respect to the center line.

33. The optical disc drive according to claim 31, wherein at least one of the adjusting pieces comprises a spring.

34. The optical disc drive according to claim 33, wherein the spring comprises a helical spring.

* * * * *